United States Patent
Jiang et al.

(10) Patent No.: US 10,373,766 B2
(45) Date of Patent: Aug. 6, 2019

(54) METHOD OF PRODUCING A SUPER-CAPACITOR

(71) Applicant: Analog Devices, Inc., Norwood, MA (US)

(72) Inventors: Yingqi Jiang, Bedford, MA (US); Kuang L. Yang, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 16/140,406

(22) Filed: Sep. 24, 2018

(65) Prior Publication Data

US 2019/0027322 A1    Jan. 24, 2019

Related U.S. Application Data

(62) Division of application No. 14/469,004, filed on Aug. 26, 2014, now Pat. No. 10,102,981.

(51) Int. Cl.
*H01G 9/00*    (2006.01)
*H01G 11/56*    (2013.01)
*H01G 11/26*    (2013.01)
*H01G 11/84*    (2013.01)

(52) U.S. Cl.
CPC ............. *H01G 11/56* (2013.01); *H01G 11/26* (2013.01); *H01G 11/84* (2013.01); *Y02E 60/13* (2013.01)

(58) Field of Classification Search
CPC . H01G 9/00; H01G 9/12; H01G 11/56; H01G 11/26; H01G 11/84
See application file for complete search history.

(56) References Cited

U.S. PATENT DOCUMENTS

| | | |
|---|---|---|
| 5,079,674 A | 1/1992 | Malaspina |
| 5,439,756 A | 8/1995 | Anani et al. |
| 6,117,585 A | 9/2000 | Anani et al. |
| 6,356,432 B1 | 3/2002 | Danel et al. |
| 6,621,687 B2 | 9/2003 | Lewis, Jr. et al. |
| 7,061,749 B2 | 6/2006 | Liu et al. |
| 7,294,209 B2 | 11/2007 | Shakespeare |
| 7,659,014 B2 | 2/2010 | Sohn |
| 7,852,612 B2 | 12/2010 | Zhao |
| 8,503,161 B1 | 8/2013 | Chang et al. |
| 8,697,516 B2 | 4/2014 | Furukawa et al. |

(Continued)

FOREIGN PATENT DOCUMENTS

| | | |
|---|---|---|
| CN | 202353290 U | 7/2012 |
| CN | 202957152 U | 5/2013 |

(Continued)

OTHER PUBLICATIONS

International Search Report and the Written Opinion dated Feb. 25, 2016 in connection with International Application No. PCT/2015/060530.

(Continued)

*Primary Examiner* — Seahvosh Nikmanesh
(74) *Attorney, Agent, or Firm* — Wolf, Greenfield & Sacks, P.C.

(57) ABSTRACT

A method of fabricating a super-capacitor provides a substrate, and then adds an electrode and electrolyte template film, having a well for receiving the electrode, to the substrate. The method also adds a second electrolyte to the electrode and electrolyte template.

20 Claims, 7 Drawing Sheets

(56) References Cited

U.S. PATENT DOCUMENTS

| | | |
|---|---|---|
| 8,778,800 B1 | 7/2014 | Chang et al. |
| 9,275,798 B2 | 3/2016 | Momo et al. |
| 9,601,278 B2 | 3/2017 | Jiang et al. |
| 10,102,981 B2 * | 10/2018 | Jiang .................. H01G 11/26 |
| 2001/0020319 A1 | 9/2001 | Farahmandi et al. |
| 2003/0035982 A1 | 2/2003 | Ryu et al. |
| 2004/0161640 A1 | 8/2004 | Salot |
| 2004/0185310 A1 | 9/2004 | Jenson et al. |
| 2008/0199737 A1 | 8/2008 | Kazaryan et al. |
| 2010/0195261 A1 | 8/2010 | Sweeney et al. |
| 2010/0328845 A1 | 12/2010 | Hiralal et al. |
| 2010/0330433 A1 | 12/2010 | Amine et al. |
| 2011/0019337 A1 | 1/2011 | Chen et al. |
| 2011/0183180 A1 | 7/2011 | Yu et al. |
| 2012/0026643 A1 | 2/2012 | Yu et al. |
| 2012/0092809 A1 | 4/2012 | Tamachi et al. |
| 2012/0216379 A1 | 8/2012 | Martienssen et al. |
| 2013/0182373 A1 | 7/2013 | Yu et al. |
| 2014/0035098 A1 | 2/2014 | Dunn et al. |
| 2014/0321093 A1 | 10/2014 | Pande et al. |
| 2016/0064149 A1 | 3/2016 | Jiang et al. |
| 2016/0064155 A1 | 3/2016 | Jiang et al. |
| 2016/0104581 A1 | 4/2016 | Jiang et al. |
| 2016/0204492 A1 | 7/2016 | Jiang et al. |

FOREIGN PATENT DOCUMENTS

| | | |
|---|---|---|
| CN | 103219162 A | 7/2013 |
| JP | 2010-161097 A | 7/2010 |
| JP | 2012-033899 A | 2/2012 |
| KR | 10-1057410 B1 | 8/2011 |
| KR | 10-1222873 B1 | 1/2013 |
| WO | WO 2013/070989 A1 | 5/2013 |

OTHER PUBLICATIONS

El-Kady et al., Scalable fabrication of high-power graphene micro-supercapacitors for flexible and on-chip energy storage. Nature Communications. Feb. 12, 2013; 4 (1475):9 pages.

Pech et al., Research Topics—ISGE. Laboratory for Analysis and Architecture of Systems. 2014; 5 pages. https://www.laas.fr/nublic/en/research-tonics-is2e.

Wu et al., Graphene-based in-plane micro-supercapacitors with high power and energy densities. Nature Communications. Sep. 17, 2013; 4 (2487): 8 pages.

* cited by examiner

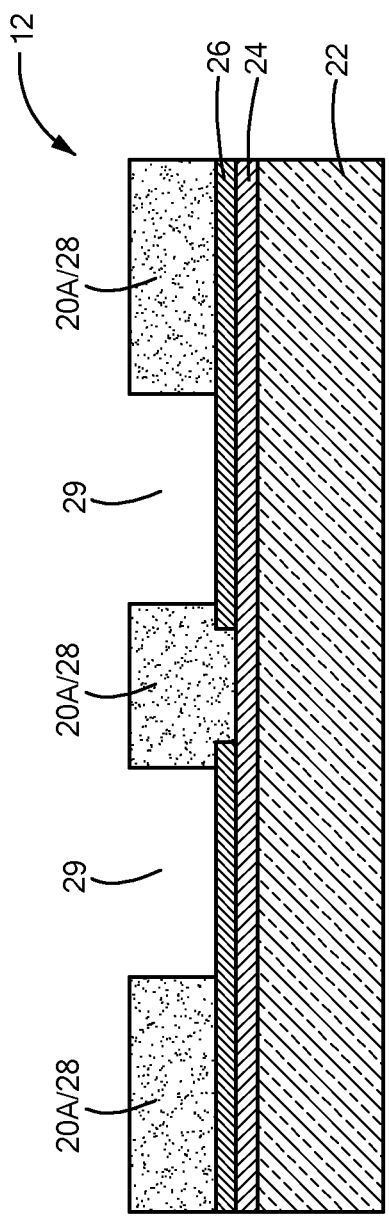
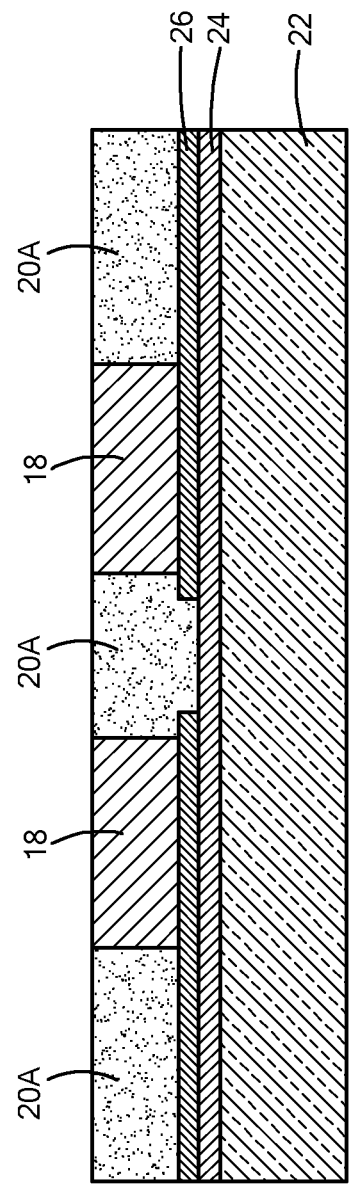

METHOD OF PRODUCING A SUPER-CAPACITOR

CROSS-REFERENCE TO RELATED APPLICATIONS

This application is a divisional claiming the benefit of U.S. patent application Ser. No. 14/469,004, filed Aug. 26, 2014, and entitled "METHOD OF PRODUCING A SUPER-CAPACITOR," which is hereby incorporated herein by reference in its entirety. This patent application is related to the following patent applications, each of which is incorporated herein, in its entirety, by reference:

U.S. patent application Ser. No. 14/593,230, filed Jan. 9, 2015, entitled, "INTEGRATED CIRCUIT WITH SHARED ELECTRODE ENERGY STORAGE DEVICES," and naming Yingqi Jiang and Kuang L. Yang as inventors, U.S. patent application Ser. No. 14/492,376, filed Sep. 22, 2014, now Pat. No. 9,601,278, entitled, "SUPER-CAPACITOR WITH SEPARATOR AND METHOD OF PRODUCING THE SAME," and naming Yingqi Jiang and Kuang L. Yang as inventors, and U.S. patent application Ser. No. 14/509,950, filed Oct. 8, 2014, entitled, "INTEGRATED SUPER-CAPACITOR," and naming Yingqi Jiang and Kuang L. Yang as inventors.

FIELD OF THE INVENTION

The invention generally relates to super-capacitors and, more particular the invention relates to producing super-capacitors.

BACKGROUND OF THE INVENTION

Although the size of portable electronic devices continues to shrink, their energy requirements often do not comparably decrease. For example, a next-generation MEMS accelerometer may have a volume that is 10 percent smaller and yet, require are only 5 percent less power than the prior generation MEMS accelerometer. In that case, more of the MEMS die may be used for energy storage. Undesirably, this trend can limit miniaturization and applicability of such electronic devices.

The art has responded to this problem by developing chip-level super-capacitors (also known as "micro super-capacitors"), which have much greater capacitances than conventional capacitors. Specifically, when compared to conventional capacitors and batteries, super-capacitors generally have higher power densities, shorter charging and discharging times, longer life cycles, and faster switching capabilities.

To enhance their energy storage capabilities, the electrodes of a super-capacitor often are formed on the micron level using a fragile material, thus complicating fabrication. This and other similar complications can reduce super-capacitor yield.

SUMMARY OF VARIOUS EMBODIMENTS

In accordance with one embodiment of the invention, a method of fabricating a super-capacitor provides a substrate, and then adds an electrolyte template film, having a well for receiving the electrode, and an electrode, to the substrate. The method also adds a second electrolyte to the electrode and electrolyte template.

The electrolyte template film may be added to the substrate before adding the electrode to the substrate, or after adding the electrode. Moreover, the substrate may have a top surface, and the electrode may include a plurality of discrete electrodes supported at least in part by the substrate. At least two of the plurality of electrodes may be spaced apart with respect to the top surface of the substrate (e.g., laterally). The substrate may include a plurality of layers, such as a base layer, an insulating layer, and at least one additional layer on the base layer (e.g., a current collector layer).

The electrode may be formed from any of a variety of materials and physical structures, such as a plurality of graphene monolayers. In that case, and in other cases, the second electrolyte may be in liquid form, enabling the method to apply a vacuum to the electrode to draw the liquid electrolyte into at least a portion of the electrode. To improve charge storage, the method also may process the electrode to form a plurality of channels configured to receive electrolyte. Moreover, some embodiments add the electrode by filling the prescribed well with electrode material.

The method may form an in-situ cap covering the electrolyte and electrode. The in-situ cap preferably is formed using a process at one or more temperatures that do not exceed about 100 degrees C. In other words, the process does not expose the electrolyte, for a non-negligible time period, to temperatures exceeding about 100 degrees C. Other embodiments using electrolytes that can withstand higher temperatures without irreversible damage can form the in-situ cap at temperatures as high as 200 degrees C. Some embodiments add the electrolyte template film by using layer transfer techniques to secure the template film to the substrate.

In accordance with another embodiment, a method of fabricating a super-capacitor provides a substrate, receives an electrolyte template film having a plurality of wells, and couples the electrolyte template film to the substrate. The method also adds electrode material to a plurality of the wells after the electrolyte template film is coupled to or supported by the substrate. The electrode material in the wells forms a plurality of electrodes that, together with the electrolyte template film, form a top surface. Next, the method adds a liquid electrolyte to the top surface to form a composite apparatus, causes the plurality of electrodes to receive the liquid electrolyte, and divides the composite apparatus into a plurality of individual dice (e.g., through conventional dicing, cutting, etc.).

In accordance with other embodiments, a method of fabricating a super-capacitor forms an electrolyte template film on a multi-layer substrate. The electrolyte template film has a well. The method also adds electrode material to the well of the template film so that the well circumscribes the electrode material, and adds a second electrolyte to the electrode and electrolyte template.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 5 schematically shows a cross-sectional view of the process of FIG. 3 through step 310.

FIG. 6 schematically shows a cross-sectional view of the process of FIG. 3 through step 312.

DESCRIPTION OF ILLUSTRATIVE EMBODIMENTS

Illustrative embodiments form micro super-capacitors in a manner that increases their robustness and fabrication yield. To that end, illustrative embodiments may form super-capacitors having an electrolyte substantially surrounding one or more electrodes. Fabrication processes preferably use an electrolyte configured as a template film in a separate process, and then add that template film to a substrate. Among other ways, the process preferably forms the electrolyte, in whatever capacity (e.g., as a template film or not), before forming the electrodes of the super-capacitor. In that latter case, the electrodes are formed in pre-specified locations of the already formed electrolyte (e.g., pre-formed wells). Details of illustrative embodiments are discussed below.

Figure 1:
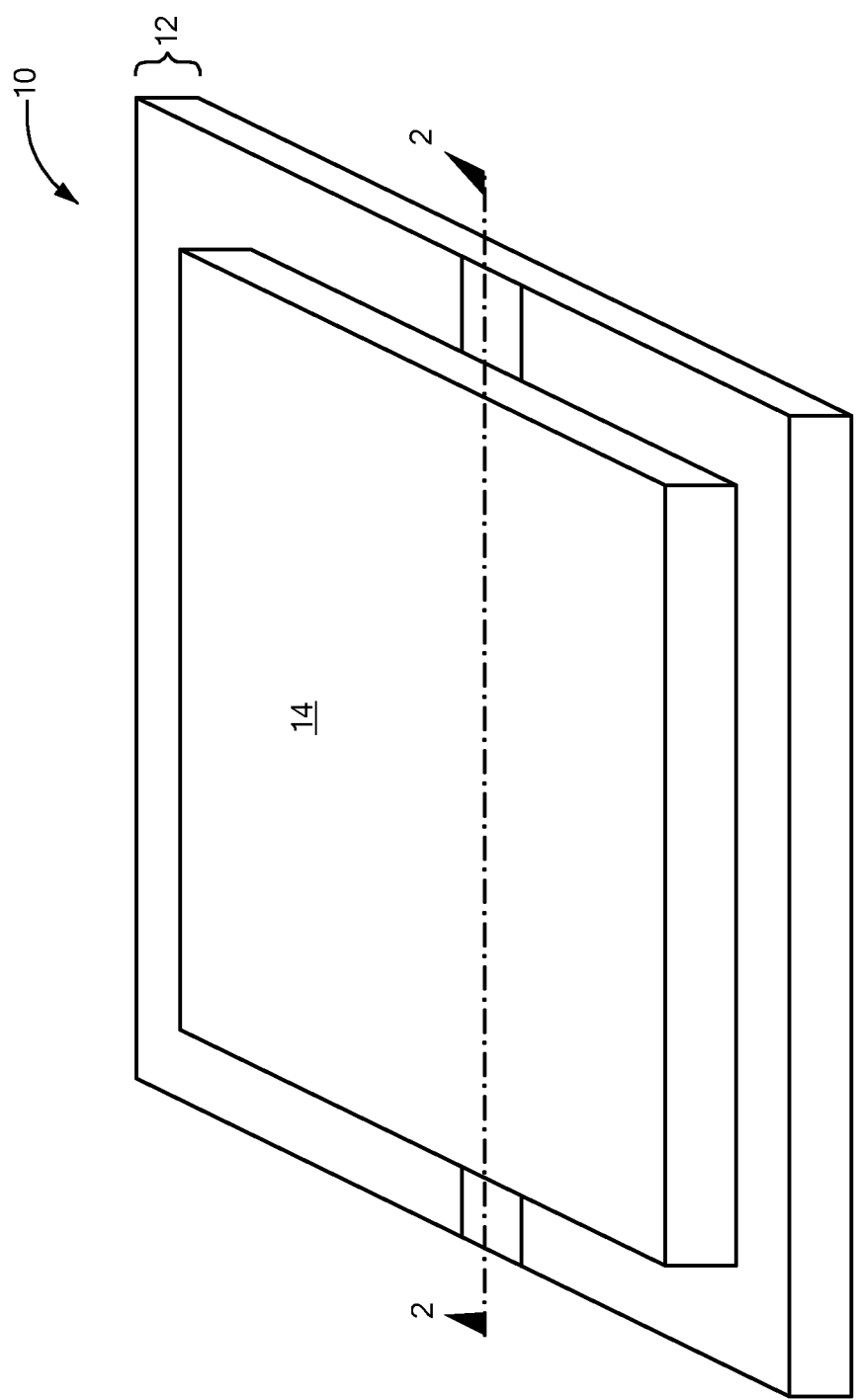
FIG. 1 schematically shows a perspective view of a micro super-capacitor that may be configured in accordance with illustrative embodiments of the invention.
Figure 2:
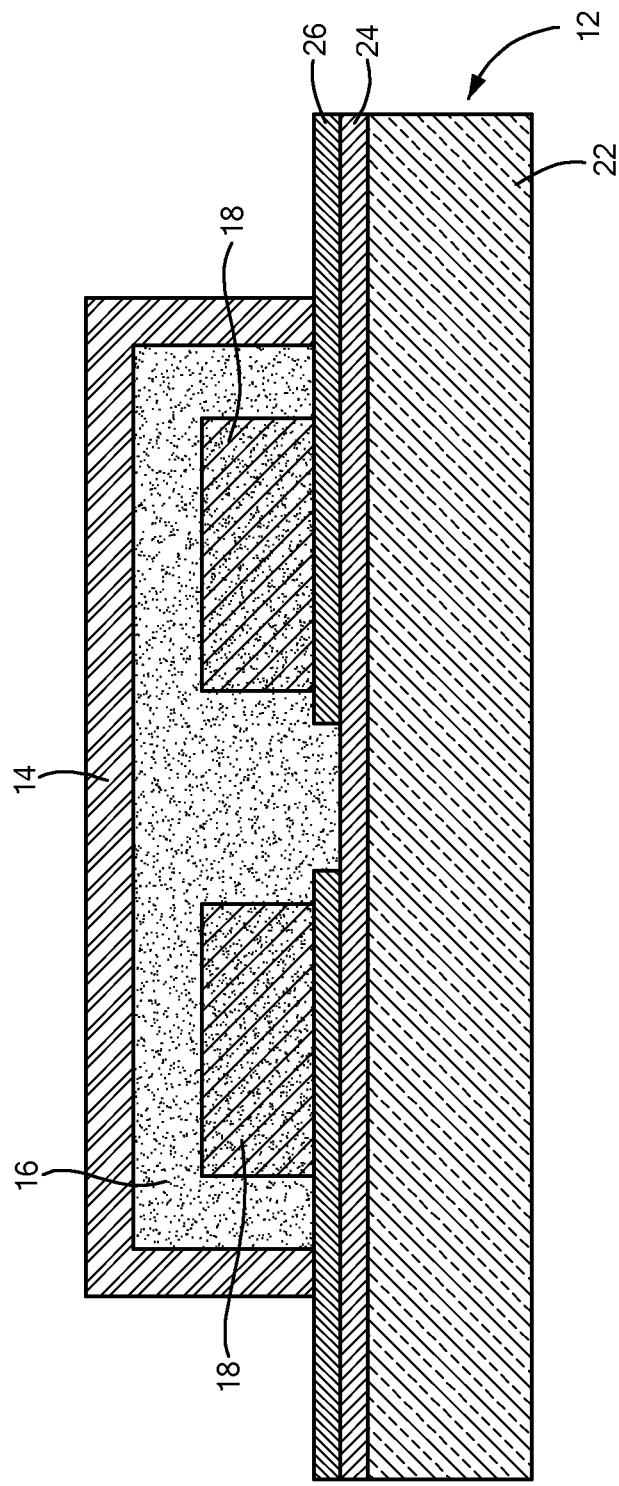
FIG. 2 schematically shows a cross-sectional view of the super-capacitor shown in FIG. 1 across line 2-2.

FIG. 1 schematically shows a perspective view of a micro super-capacitor (hereinafter "super-capacitor 10") configured in accordance with illustrative embodiments of the invention. FIG. 2 schematically shows a cross-sectional view of the super-capacitor 10 along line 2-2 of FIG. 1. Specifically, the super-capacitor 10 is a unitary chip-level device having a multilayer substrate 12 supporting a cap 14 that together form an interior chamber 16. Among other things, the interior chamber 16 has a plurality of electrodes 18 and electrolyte material(s) (generally identified by reference number "20" and also referred to below as "first electrolyte 20A," "second electrolyte 20B," and "electrolyte material 20")) that together form a capacitance. In other words, the electrodes 18 and electrolyte material 20 cooperate to have the capacity to store a prescribed electrical charge.

The electrodes 18 may be formed from conventional materials known in the art—preferably a porous material. For example, as discussed in greater detail below, the electrodes 18 may be formed from graphene, which is known to be a porous material with tortuous interior and exterior surfaces. Virtually every surface of the electrode 18 exposed to the electrolyte 20 therefore may be considered part of the surface area the capacitor plates represented in the well-known equation:

$$C = \varepsilon * (A/D) \quad \text{(Equation 1)},$$

where:
C is capacitance,
ε is a constant,
A is the area, and
D is distance.

Indeed, those skilled in the art can use other materials to form the electrode 18, such as activated carbon, carbon aerogel, or carbon nanotubes, to name but a few. Accordingly, discussion of graphene is by example only and not intended to limit various other embodiments of the invention.

In a similar manner, the electrolyte 20 can be formed from any of a wide variety of other corresponding materials. For example, electrolyte 20 can be formed from an aqueous salt, such as sodium chloride, or a gel, such as a polyvinyl alcohol polymer soaked in a salt. Some embodiments may use an ionic liquid, in which ions are in the liquid state at room temperature. Although not necessarily aqueous, such electrolytes are known to be extremely conductive due to the relatively free movement of their ions. The inventors believe that such an electrolyte 20 should produce a super-capacitor 10 with relatively high energy storage capacity because, as known by those skilled in the art, the energy storage of the capacitor is a function of the square of the voltage.

As noted, the electrolyte 20 preferably is generally integrated with both the internal and external surfaces of the electrodes 18. Among other things, the internal surfaces may be formed by tortuous internal channels and pores within the electrodes 18. The external surfaces simply may be those surfaces visible from the electrode exteriors. The electrolyte 20 and noted electrode surfaces thus are considered to form an interface that stores energy.

Depending upon the electrode material, electrons can flow somewhat freely within the electrodes 18. For example, electrons can flow within graphene. The electrolyte 20, however, ads as an insulator and thus, does not conduct the electrons from the electrodes 18. In a corresponding manner, the electrolyte 20 has ions that can migrate somewhat freely up to the interface with the electrodes 18. Like electrons in the electrodes 18, ions in the electrolyte 20 do not migrate through the interface.

When subjected to an electric field, ions within the electrolyte 20 migrate to align with the electric field. This causes electrons and holes in the electrodes 18 to migrate in a corresponding manner, effectively storing charge. For example, in a prescribed electric field, positive ions in the electrolyte 20 may migrate toward a first electrode surface, and the negative ions in the electrolyte 20 may migrate toward a second electrode surface. In that case, the positive ions near the first electrode surface attract electrons (in the electrode) toward that interface, while the negative ions near the second electrode surface attract holes (in the electrode) for that interface. The distance of the ions to the interface plus the distance of the electrons to the same interface (on the opposite side of the interface) represent distance "d" of Equation 1 above.

Although useful as an electrode material, graphene still does not have optimal conductivity properties. Accordingly, illustrative embodiments also form a current collector layer on or as part of the substrate 12 to provide exterior access to the electrodes 18. Among other things, the current collector layer may be formed from a highly conductive metal, such as gold, or a highly doped semiconductor, such as polysilicon. Those skilled in the art can select other materials for this purpose. Prior art methods for fabricating a super-capacitor like that of FIGS. 1 and 2 suffer from a number of drawbacks. For example, the fragile structure of certain electrode materials, such as graphene, can become damaged during fabrication, which can reduce surface area and cause short-circuits. Among other ways, some such prior art processes damage the electrodes 18 as they pattern the electrolyte 20 with a conventional photoresist. To avoid inadvertent short circuits caused by damaged electrodes 18, some such prior art processes space the electrodes 18 farther apart, which creates another problem—it increases the size of the overall device. Illustrative embodiments aim to mitigate these problems.

Figure 3:
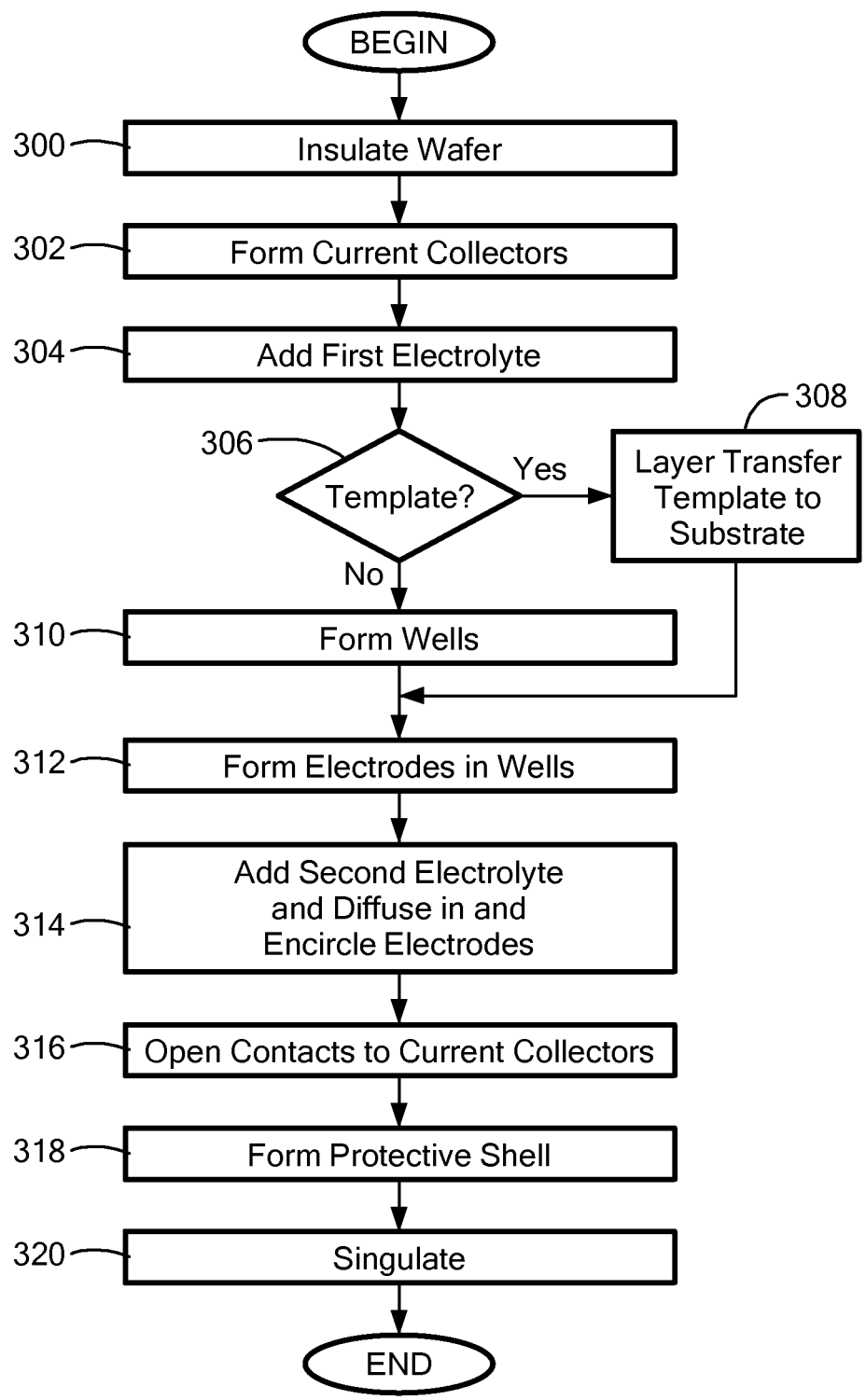
FIG. 3 shows a process of fabricating the super-capacitor of FIG. 1 in accordance with illustrative embodiments of the invention.

Specifically, illustrative embodiments fabricate the super-capacitor 10 in a manner that increases fabrication yield and reliability without the need to increase its footprint or profile. To that end, FIG. 3 shows a process of fabricating the super-capacitor 10 of FIGS. 1 and 2 in accordance with illustrative embodiments of the invention. It should be noted that this process is substantially simplified from a longer process that normally would be used to form the super-capacitor 10. Accordingly, the process of forming the super-capacitor 10 has many steps, such as testing steps or additional passivation steps, that those skilled in the art likely would use. In addition, some of the steps may be performed in a different order than that shown, or at the same time. Those skilled in the art therefore can modify the process as appropriate. It also should be noted that the process of FIG. 3 is a bulk process, which forms a plurality of super-capacitors 10 on the same wafer/base at the same time. Although much less efficient, those skilled in the art can apply these principles to a process that forms only one super-capacitor 10.

The process begins at step 300, which forms an electrically insulating material 24 on the top surface of a base 22 (beginning the formation of the substrate 12). For example, the base 22 may comprise a bulk silicon wafer or a silicon-on-insulator (SOI) wafer commonly used in the semiconductor industry. When using such wafers, the insulating material 24 may include an oxide, such as silicon dioxide.

The process continues to step 302, which forms the current collectors 26 on the insulator layer (i.e., this step forms a current collector layer of the substrate 12). To that end, the process may deposit a metal, such as gold, on the top surface of the insulator. After the metal has sufficiently hardened, the process then patterns the metal layer in a conventional manner to form a two-dimensional array of current collectors 26 across the substrate 12. Each set of current collectors 26 across the face of the substrate 12 is intended for use as one individual super-capacitor 10.

Next, the process adds a first electrolyte 20A at step 304. Illustrative embodiments envision at least two different ways to form this first electrolyte 20A. Specifically, at step 306, the process determines whether or not the first electrolyte 20A is in the physical form of a template film 28. In this context, a template film 28 may be considered to be a free-standing film of electrolyte 20 that is substantially fully cured. In other words, the template film 28 is an independent object that can be moved and, in this case, added to the substrate 12 through conventional processes. In fact, the template film 28 may be formed in a process that is separate from that of FIG. 3. For example, an independent vendor may form and supply the template film 28 to a semiconductor manufacturing facility for incorporation into the process of FIG. 3.

Figure 4:
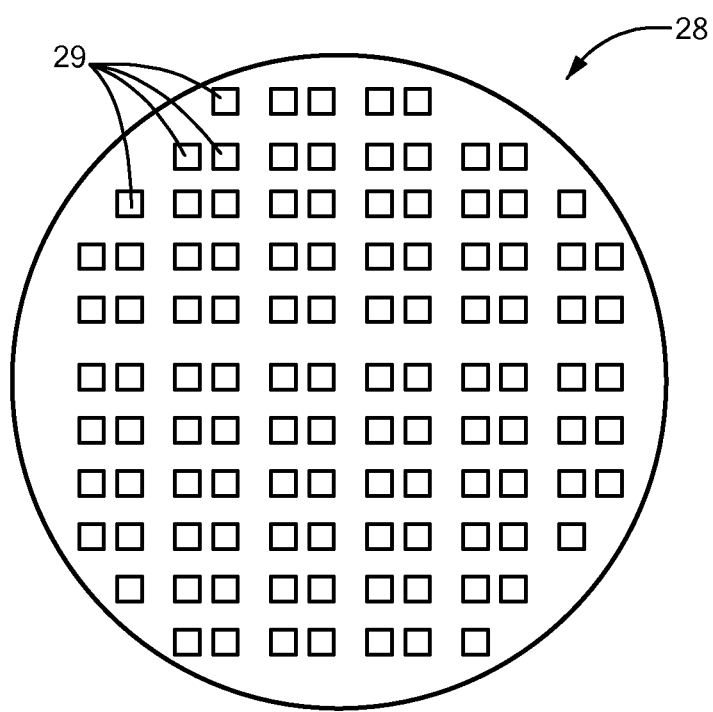
FIG. 4 schematically shows a top view of an electrolyte template film that may be used to fabricate a super-capacitor in accordance with illustrative embodiments of the invention.

FIG. 4 schematically shows a top view of one example of an electrolyte template film 28 the process may use. As shown, the template film 28 has a generally round shape following that of the wafer, and a plurality of openings or wells 29 to receive electrode material 20 (discussed below). In this case, each pair of closely spaced wells 29 of the template ultimately will be part of a single super-capacitor 10. The individual wells 29 that do not have a second, closely spaced well 29 (i.e., those wells 29 are near the edges of the template film 28) may be discarded.

Accordingly, if the first electrolyte 20A is in the form of a template film 28, then step 308 uses conventional processes to transfer the film 28 to the substrate 12. For example, illustrative embodiments may use conventional layer transfer processes to secure or couple the electrolyte template film 28 to the substrate 12.

Conversely, if the electrolyte 20 is not a template film 28, then the process moves to step 310, which deposits a layer of the first electrolyte 20A onto the top, exposed surface of the substrate 12. Next, this step patterns the electrolyte 20 into a substrate layer having the noted plurality of wells 29. For example, the step may use oxygen plasma to pattern the electrolyte layer through a patterned masking layer subsequently added to the first electrolyte 20A. The masking layer subsequently should be removed before further processing. FIG. 5 shows the apparatus at this stage of fabrication.

After adding the first electrolyte 20A, the process begins forming electrodes 18 in the various wells 29 (step 312). As shown, the electrodes 18 are spaced apart with respect to the top planar surface of the substrate 12 to which they were attached. Any of a number of different types of electrodes 18 may be used. In some embodiments, step 312 may form the electrodes 18 in the wells 29 by simple physical deposition (e.g., sputtering, evaporation), chemical deposition (e.g., chemical vapor deposition and electro-deposition), or solution casting with an air dry. In illustrative embodiments, repeated solution casting of reduced graphene oxide suspension into the current collector layers form each electrode 18 as a plurality of stacked graphene monolayers, i.e., each monolayer is a single layer of graphene atoms. The inventors believe that this stacking of monolayers significantly improves the amount of expected surface area in contact with the electrolyte 20.

FIG. 6 schematically shows the apparatus at this stage of fabrication. The electrodes 18 preferably are generally flush with the top of first electrolyte 20A (from the perspective of FIG. 6), thus effectively forming a single, generally planar top surface. Other embodiments, however, may not form such a planar top surface. Again, as noted above, closely spaced electrodes 18 likely will be part of the same super-capacitor 10. It also should be noted, however, that although various figures show only two electrodes 18 for each super-capacitor 10, various embodiments can use different numbers of electrodes 18, such as one electrode 18, three electrodes 18, or more electrodes 18. Accordingly, discussion of two electrodes 18 is for discussion purposes only.

Figure 7:
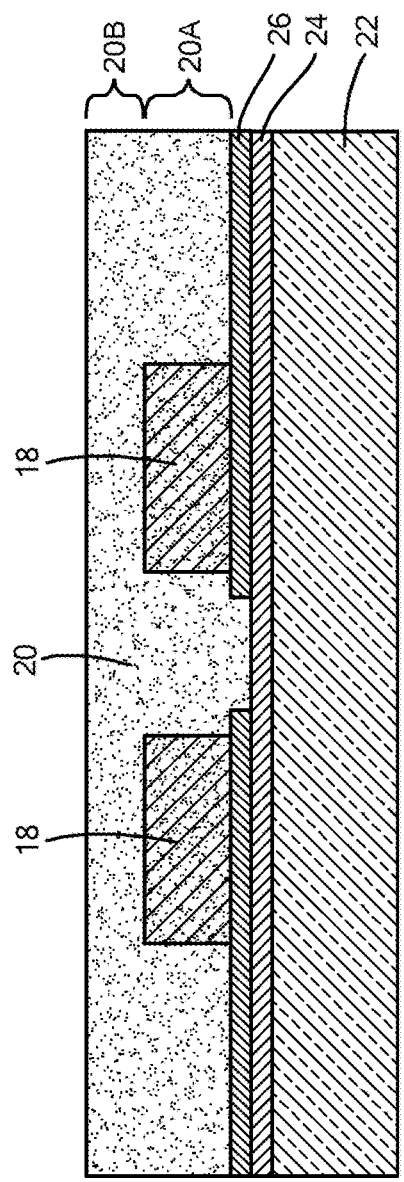
FIG. 7 schematically shows a cross-sectional view of the process of FIG. 3 through step 314.

The process continues to step 314, which adds a second electrolyte 20B In the apparatus, and then diffuses and encircles the electrodes 18 with the second electrolyte 20B. FIG. 7 schematically shows a cross-sectional view of the apparatus at this stage of fabrication. To that end, illustrative embodiments may pour or otherwise deposit a liquid electrolyte 20 (i.e., the second electrolyte 20B) onto the exposed top surface, and then apply a vacuum infiltration process to the apparatus, including to the electrodes 18, which draws the liquid electrolyte 20 into the porous electrode material 18.

Illustrative vacuum infiltration processes preferably substantially uniformly distribute the second electrolyte 20B within the porous material without damaging the morphology of the electrode 18. Since the electrolyte 20B is in liquid form, heating is not generally necessary at this stage. The step concludes by permitting the second electrolyte 20B to cure, effectively integrating with the first electrolyte 20A.

Alternative embodiments may use different first and second electrolytes 20A and 20B that are not necessarily integrated at this step, or the same electrolyte 20. Ideally, this step causes every exposed interior and exterior surface of each electrode 18 to directly contacts electrolyte material 20. Indeed, although real-world processing constraints may not permit such an ideal result, illustrative embodiments drive toward that end. Accordingly, various embodiments draw the liquid electrolyte 20 into at least a portion of each electrode 18. Yet other embodiments may skip this vacuum process.

At this stage of the process, after it is cured, electrolyte material 20 substantially fully encapsulates the electrodes 18 and part or all of the current collectors 26. To provide access to the electrodes 18, step 316 opens contacts to the current collectors 26. To that end, illustrative embodiments remove cured. electrolyte material 20 covering at least portion of the current collectors 26, thus providing a window for interconnection with exterior devices. For example, this step may open a rectangular window having at least one 200 micron dimension. Conventional techniques may be used to remove this portion of the electrolyte 20, such as by using masked oxygen plasma etching. Accordingly, when added to a larger system, illustrative embodiments can use conventional interconnection techniques, such as wire bonds, to electrically connect with other components.

The apparatus now needs to be physically protected from the environment. Accordingly, step 318 seals each super-capacitor 10 with a packaging material or other protective shell. In other words, as noted above, the cap 14 forms the noted interior chamber 16 that encapsulates the electrolyte 20 and electrodes 18. Some embodiments form this cap 14 as an in-situ cap, while others may form the cap 14 as a stand-alone cap. Illustrative embodiments form the cap 14 with a low temperature packaging material, such as gel packaging, if the electrolyte 20 is not capable of tolerating high temperatures (e.g., temperatures above 100 degrees C.). Accordingly, step 318 preferably uses processes that operate at one or more temperatures not exceeding about 100 degrees C.

The process concludes at step 320, which separates/singulates the various super-capacitors 10 formed on the substrate 12. Indeed, those skilled in the art can use any of a wide variety of techniques for separating the super-capacitors 10, such as conventional saw or dicing processes along scribe streets or prescribed regions. Other embodiments can use a perforated base 22, or other techniques known in the art. Regardless of the technique, this step concludes with a plurality of die-level super-capacitors 10 ready for testing, further processing, or commercial use.

Accordingly, the process of FIG. 3 forms the first electrolyte 20A on the substrate 12 before adding the electrodes 18. Alternative embodiments, however, may form the electrodes 18 before adding the first electrolyte 20A. For example, the electrodes 18 may be formed as islands and the first electrolyte 20A may be subsequently added as a template film 28—with the electrodes 18 within the wells 29. In either case, the first electrolyte 20A may or may not be in the form of a template film 28.

Figure 9:
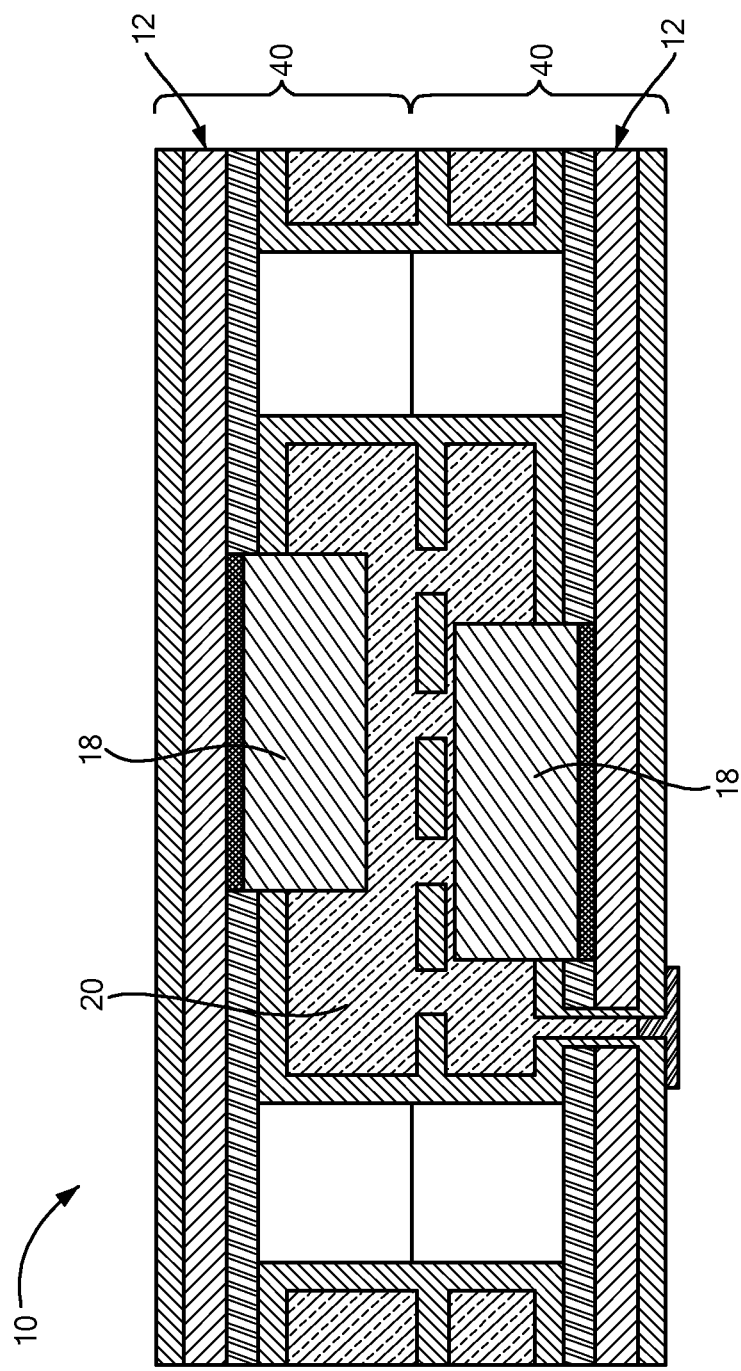
FIG. 9 schematically shows a cross-sectional view of another embodiment of a super-capacitor that can be configured in accordance with illustrative embodiments of the invention.

Moreover, various embodiments apply to super-capacitors 10 having other configurations, such as those having electrodes 18 that are not spaced out along the top planar surface of the base 22. Instead, some such super-capacitors 10 may have stacked electrodes 18—i.e., electrodes 18 in different planes that are generally parallel with the plane of the top surface of the base 22. FIG. 9 shows one example of such an embodiment. In this case, the process of FIG. 3 can form separate preliminary apparatuses 40 (i.e., having respective electrodes 18 and electrolyte 20 on substrates 12), and then secure both together to form a single super-capacitor, such as that shown in FIG. 9.

Figure 8:
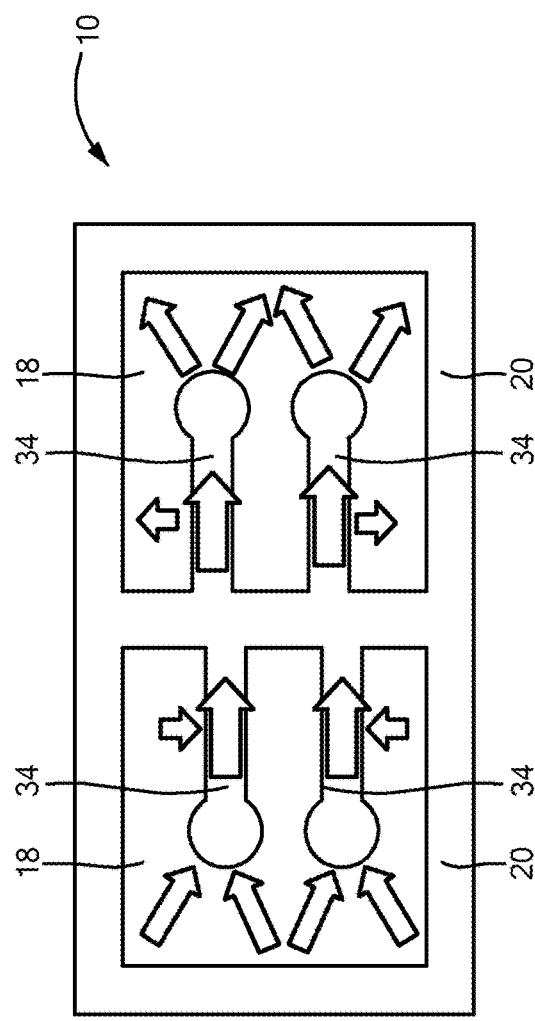
FIG. 8 schematically shows a top, horizontal cross-sectional view of an alternative embodiment of the super-capacitor.

Some embodiments specially configure the electrodes 18 to facilitate ion and electron movement. To that end, FIG. 8 schematically shows a top, cross-sectional view of a super-capacitor 10 having electrode channels 34 for accepting more electrolytes 20 deep within the electrodes 18. This enables ions to have a shorter travel distance. Some embodiments may be considered to cause the electrolyte template film 28 effectively form branches that root or extend into the electrode 18.

Accordingly, illustrative embodiments more efficiently and effectively form a super-capacitor 10 that is more robust/reliable, has a higher yield, and consequently, can have improved operating characteristics.

Although the above discussion discloses various exemplary embodiments of the invention, it should be apparent that those skilled in the art can make various modifications that will achieve some of the advantages of the invention without departing from the true scope of the invention.

What is claimed is:

1. A super-capacitor, comprising:
   a substrate;
   an electrolyte template film having a plurality of wells and coupled to the substrate;
   a plurality of electrodes disposed in the plurality of wells of the electrolyte template film, the plurality of electrodes and the electrolyte template film forming a top surface; and
   an electrolyte coupled to the top surface.

2. The super-capacitor as defined by claim 1, wherein a first electrode of the plurality of electrodes comprises a plurality of graphene monolayers.

3. The super-capacitor as defined by claim 1, further comprising a plurality of channels in a first electrode of the plurality of the electrodes, wherein the plurality of channels are filled with the electrolyte.

4. The super-capacitor as defined by claim 1, wherein the substrate includes a base layer and at least one additional layer on the base layer.

5. The super-capacitor as defined by claim 1, further comprising a cap covering the electrolyte template film, the electrolyte, and the plurality of electrodes.

6. A super-capacitor, comprising:
   a substrate;
   an electrolyte template film coupled to the substrate, the electrolyte template film having a well for receiving an electrode;
   the electrode circumscribed by the well of the electrolyte template film and supported by the substrate; and
   an electrolyte coupled to the electrode and the electrolyte template film.

7. The super-capacitor as defined by claim 6, wherein the electrolyte template film and the electrode form a substantially planar top surface opposite the substrate.

8. The super-capacitor as defined by claim 6, wherein the substrate has a top planar surface, further comprising a plurality of electrodes supported by the substrate, at least two of the plurality of electrodes being spaced apart with respect to the top planar surface of the substrate.

9. The super-capacitor as defined by claim 6, wherein the substrate includes a current collector layer.

10. The super-capacitor as defined by claim 6, wherein the electrode is supported by a portion of the substrate at a bottom of the well of the electrolyte template film.

11. The super-capacitor as defined by claim 6, wherein the electrolyte comprises a liquid electrolyte, wherein the liquid electrolyte is drawn into at least a portion of the electrode.

12. The super-capacitor as defined by claim 6, wherein the electrode comprises a plurality of graphene monolayers.

13. The super-capacitor as defined by claim 6, further comprising a plurality of branches in the electrolyte, the plurality of branches rooting into the electrode.

14. The super-capacitor as defined by claim 6, wherein the electrode is enclosed by the substrate, the electrolyte, and walls of the well of the electrolyte template film.

15. The super-capacitor as defined by claim 6, further comprising an in-situ cap covering the electrolyte and the electrode.

16. The super-capacitor as defined by claim 15, wherein the substrate includes a base layer and at least one additional layer on the base layer.

17. A super-capacitor, comprising:
an electrolyte template film on a multi-layer substrate, the electrolyte template film having a well;
electrode material disposed in the well of the electrolyte template film, the well circumscribing the electrode material; and
an electrolyte coupled to the electrode material and the electrolyte template film.

18. The super-capacitor as defined by claim 17, wherein the electrode materials is supported by a portion of the substrate at a bottom of the well of the electrolyte template film.

19. The super-capacitor as defined by claim 17, wherein the electrolyte template film comprises cured electrolyte material.

20. The super-capacitor as defined by claim 17, further comprising multiple structures each having an electrolyte template film and an electrode, wherein the multiple structures are stacked to form a stacked super-capacitor.

* * * * *